United States Patent [19]

Castonguay

[11] 4,301,434
[45] Nov. 17, 1981

[54] UNDERVOLTAGE RELEASE RESET AND LOCKOUT APPARATUS

[75] Inventor: Roger N. Castonguay, Terryville, Conn.

[73] Assignee: General Electric Company, New York, N.Y.

[21] Appl. No.: 162,271

[22] Filed: Jun. 23, 1980

[51] Int. Cl.³ .................. H01H 73/00; H01H 75/02; H01H 83/00

[52] U.S. Cl. .............. 335/20; 200/153 SC; 335/26

[58] Field of Search .................. 335/20, 26, 27, 28, 335/13, 17, 166, 167, 168, 169, 170, 171, 172, 173, 174, 175; 200/320, 308, 153 SC, 153 G, 153 H

[56] References Cited

U.S. PATENT DOCUMENTS

| | | | |
|---|---|---|---|
| 4,075,584 | 2/1978 | Castonguay et al. | 335/20 |
| 4,166,989 | 9/1979 | Castonguay et al. | 335/17 |
| 4,211,989 | 7/1980 | Acampora | 335/170 |
| 4,251,702 | 2/1981 | Castonguay et al. | 200/153 SC |

*Primary Examiner*—Harold Broome
*Attorney, Agent, or Firm*—Richard A. Menelly; Walter C. Bernkopf; Philip L. Schlamp

[57] ABSTRACT

In a circuit breaker equipped with a hook releasably holding movable contacts in a hooked open position, the plunger of an undervoltage release solenoid is releasably latched in its seated position to inhibit premature tripping of the breaker latch and thus enable the operating mechanism to be charged. Articulation of the hook leading to release of the contacts from their hooked open position precipitates unlatching of the plunger and discharge of the operating mechanism to preclude breaker closure into an undervoltage condition. Resetting of the plunger is effected under the control of the operating mechanism by a separate spring-power reset arm.

8 Claims, 10 Drawing Figures

UNDERVOLTAGE RELEASE RESET AND LOCKOUT APPARATUS

REFERENCE TO RELATED APPLICATIONS

The instant application is related to the commonly assigned, concurrently filed patent applications entitled Circuit Breaker Trip Latch Assembly Ser. No. 162,281, Flux Shifter Reset Assembly Ser. No. 162,280, Circuit Breaker Electrical Closure Control Apparatus Ser. No. 162,278, Circuit Breaker Condition Indicator Apparatus Ser. No. 162,282 and Circuit Breaker Hook Apparatus Ser. No. 162,279.

BACKGROUND OF THE INVENTION

The present invention relates to industrial circuit breakers and particularly to apparatus enabling the breaker operating mechanism to sustain a charge against a de-energized undervoltage release solenoid.

In addition to protecting load circuits from a wide range of overcurrent conditions, circuit breakers are often called upon to protect voltage sensitive loads, such as motors, from sustained undervoltage conditions. To this end, circuit breakers are equipped with undervoltage releases (UVR) operating to trip the breaker in response to an abnormally low voltage condition. Such UVRs traditionally take the form of a solenoid whose coil is energized from the line voltage. Its plunger is biased to an extended position by the calibrated force of a spring. With the plunger in its retracted, seated position, as long as the line voltage remains substantially at its nominal level, the electromagnetic force developed by the solenoid overpowers the spring to maintain its plunger seated in its retracted position. When the line voltage drops to a sustained abnormally low level, the spring then becomes overpowering, and the plunger is pulled to its extended position. A trip member, linked to the plunger, is incidentally shifted to a trip position precipitating conditioning of the breaker latch to discharge or trip the movable contact operating mechanism, and the movable contacts are abruptly propelled to their open position.

Before the operating mechanism can be recharged, the solenoid plunger is forcibly returned to its seated position, in the process shifting the trip member out of its trip position, so as to allow the latch to reset to a condition enabling it to sustain a charge imparted to the operating mechanism. However, if the line voltage remains abnormally low, the spring immediately pulls the UVR plunger to its extended position, shifting the trip lever to its trip position. The latch is thus defeated, and the charge imparted to the operating mechanism is dumped, causing the mechanism to crash. If the circuit breaker is equipped with a motor operator mechanism to effect recharging of the breaker operating mechanism and it is programmed to automatically execute a charging cycle each time the breaker is tripped open, the operating mechanism is repeatedly charged and crashed under a sustained undervoltage condition, leading ultimately to failure of the equipment. While it would be advantageous to permit the operating mechanism to sustain a charge in the face of a sustained undervoltage condition, it is deemed important that the breaker not be permitted to close back in on such a sustained undervoltage condition.

It is accordingly an object of the present invention to provide apparatus for locking out an undervoltage release such as to permit a circuit breaker operating mechanism to sustain a charge despite a prevailing undervoltage condition.

A further object is to provide undervoltage release lockout apparatus of the above character which nevertheless prevents breaker closure into a prevailing undervoltage condition.

An additional object is to provide UVR lockout apparatus of the above character which includes improved means for reliably resetting the undervoltage release automatically as the circuit breaker is tripping open.

Another object is to provide UVR lockout and reset apparatus of the above character which is efficient in construction and reliable in operation.

Other objects of the invention will in part be obvious and in part appear hereinafter.

SUMMARY OF THE INVENTION

In accordance with the present invention there is provided undervoltage release (UVR) reset and lockout apparatus for utilization in an industrial circuit breaker to automatically reset the UVR after it has dropped out to trip the breaker open and then to enable the breaker operating mechanism to be recharged, but nevertheless to preclude breaker reclosure, under a prevailing undervoltage condition. The present invention has particular, but not necessarily limited application to a stored energy, reclosure type circuit breaker, such as that disclosed in commonly assigned, application Ser. No. 52,276, filed June 25, 1979, now U.S. Pat. No. 4,251,702 the disclosure of which is specifically incorporated herein by reference.

The subject apparatus includes an undervoltage release solenoid whose plunger is magnetically held in a seated, retracted position against a spring biasing it to an extended position as long as the line voltage energizing the solenoid coil remains substantially at its nominal level. A trip lever, linked to the plunger, is held in an inactive position as long as the plunger remains seated. If the line voltage drops to an abnormally low level, the spring becomes over-powering, and the plunger is pulled to its extended position, shifting the trip lever to a trip position effective in conditioning a circuit breaker latch to discharge the breaker movable contact operating mechanism. The operating mechanism articulates to its tripped condition, in the process propelling the movable contacts from a closed position to a tripped open position.

As the operating mechanism articulates to its tripped condition, a spring powered reset arm is released to forcibly return the plunger to its seated position and thus the trip lever to its inactive position. The breaker latch is thus released so that it can reset to its latching condition. In its inactive position, the trip lever is releaseably engaged by lockout means to sustain its position in the event the UVR solenoid is incapable of sustaining the plunger in its seated condition due to a continuing undervoltage condition. Under these circumstances, the operating mechanism may be charged by forcibly articulating it back to its reset condition where it is sustained by the breaker latch. The charged operating mechanism propels the movable contacts in a closing direction from their tripped open position, however they are intercepted and held in a hooked open position by a hook. Thus, the operating mechanism is charged, and the breaker is prepared to close when the movable contacts are released from their hooked open position by the hook, despite a prevailing undervoltage condition. To prevent breaker closure under these circumstances, the lockout means is coupled with the hook, such that insipient actuation of the hook leading to release of the movable contacts from their hooked open position effects release of the trip lever from its inactive position. The plunger spring promptly shifts the trip lever to its trip position. The breaker latch is defeated to discharge or dump the operating mechanism before the movable contacts are released from their hooked open position. Thus the unhooked movable contacts, instead of moving toward their closed position, are propelled directly to their tripped open position.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings in which:

DESCRIPTION OF THE DRAWINGS

Corresponding reference numerals refer to like parts throughout the several views of the drawings.

DETAILED DESCRIPTION

Figure 1:
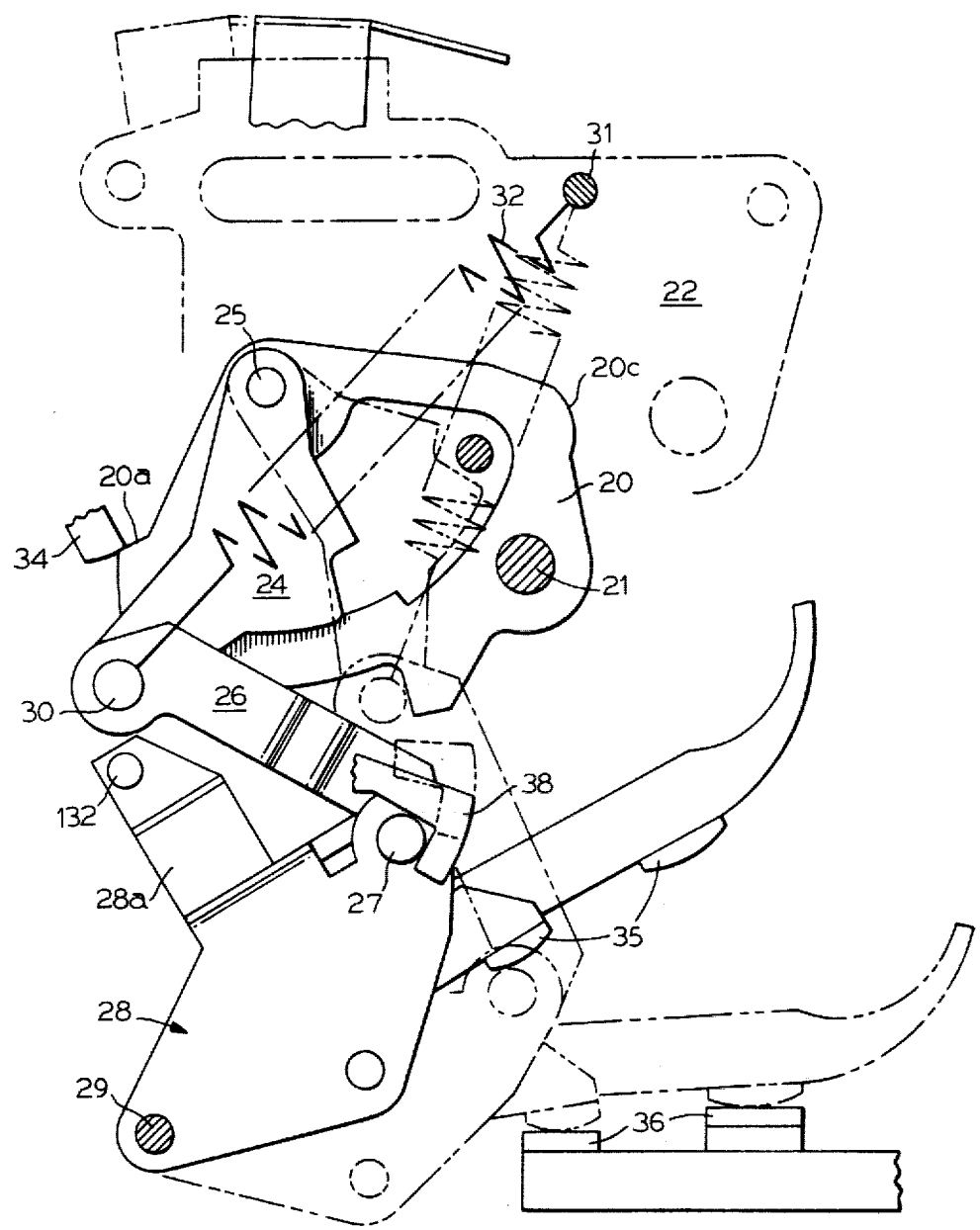
FIG. 1 is a side elevational view of a circuit breaker spring-powered movable contact operating mechanism.

Turning to the drawings, there is shown in FIG. 1, a circuit breaker movable contact operating mechanism corresponding to that disclosed in the above-noted copending application, Ser. No. 52,276. Thus, a cradle 20 is fixedly mounted on a pin 21 journalled by opposed mechanism frame sideplates 22. A toggle linkage consisting of an upper link 24 and a lower link 26 connects cradle 20 to a center pole movable contact assembly 28, pivotally mounted at 29. Specifically, the upper end of link 24 is pivotally connected to the cradle by a pin 25, while the lower end of link 26 is pivotally connected to the center pole movable contact assembly by a pin 27. The other ends of these toggle links are pivotally interconnected by a knee pin 30. Mechanism tension springs 32 act between the toggle knee pin and a stationary pin 31 supported between the frame sideplates 22.

From the description thus far, it will be noted that, by virtue of the position of spring anchoring pin 31, the line of action of the mechanism springs, while in their charged state by virtue of cradle 20 being in its latched reset position sustained by the engagement of a latch 34 with cradle latch shoulder 20a, is always situated to the right of the upper toggle link pivot pin 25. Thus, the mechanism springs continuously act to straighten the toggle. Since straightening of the toggle forces the movable contact assemblies 28, ganged together by crossbar 28a, to pivot downwardly to their phantom line, closed circuit position with their movable contacts 35 engaging stationary contacts 36, the circuit breaker is always biased toward contact closure while cradle 20 is latched in its reset position.

To control the moment of contact closure, a hook 38 engages pin 27 to hold movable contact assemblies 28 in a hooked open circuit position while the cradle is latched in its reset position and while it is being returned to its latched, reset position from a clockwise-most tripped position to charge the mechanism springs. Thus the toggle is maintained collapsed to the left as seen in FIG. 1. When the hook is removed, the movable contact assemblies 28 are pivoted to their closed circuit positions as springs 32 act to abruptly straighten toggle links 24, 26.

Figure 2:
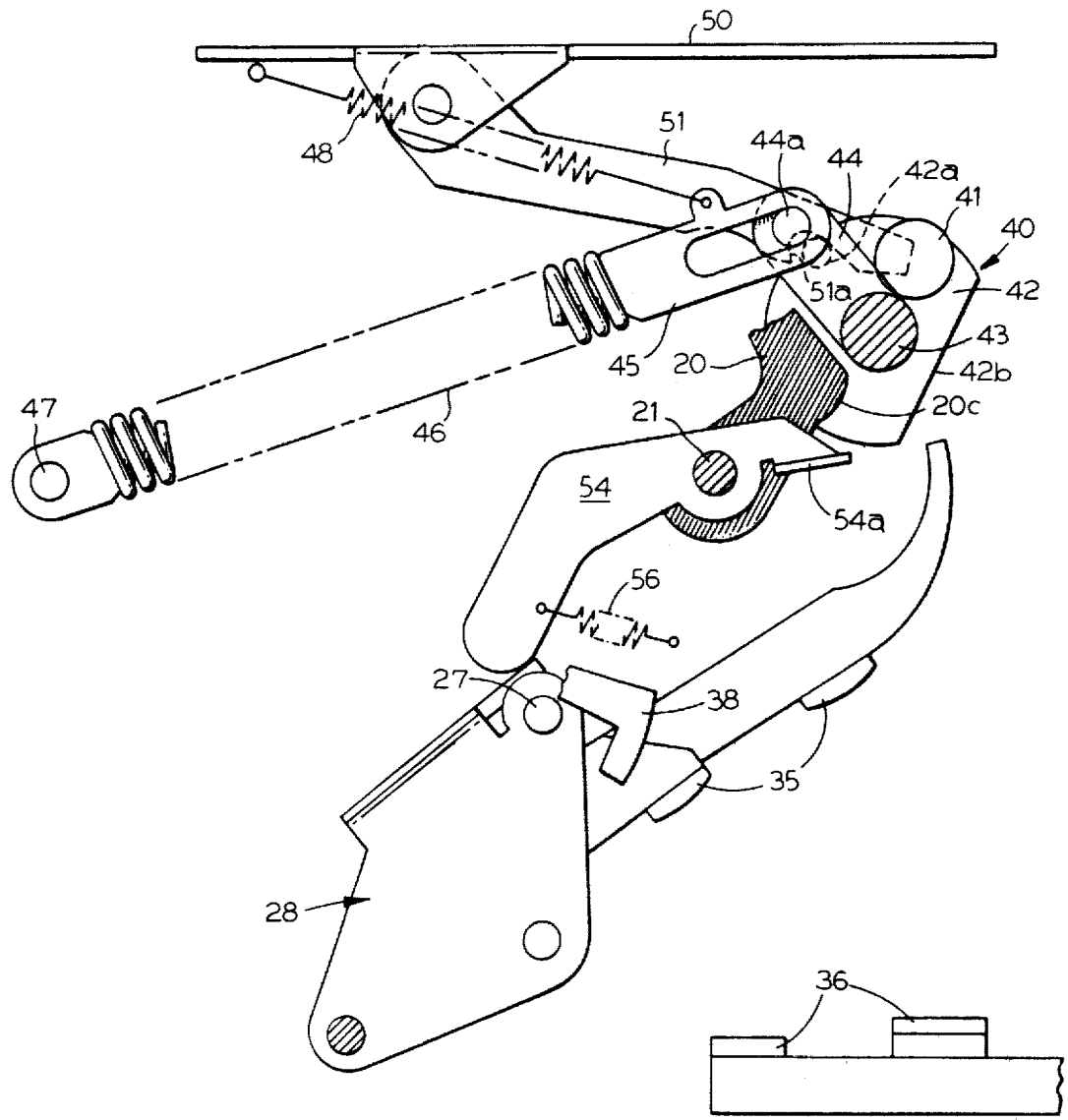
FIG. 2 is a simplified, side elevational view of a spring-powered charging mechanism utilized to charge the movable contact operating mechanism of FIG. 1.
Figure 3:
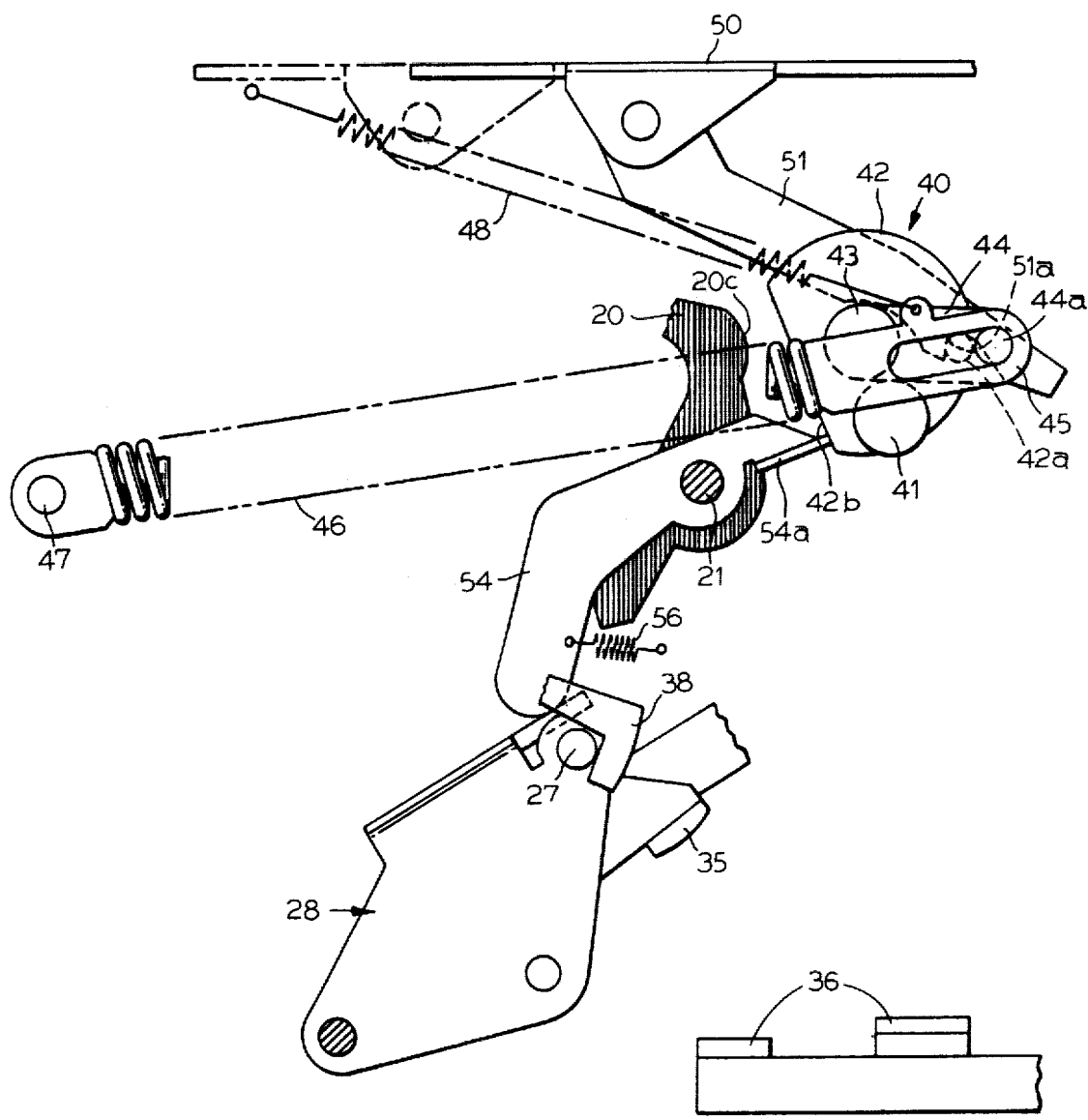
FIG. 3 is a simplified, side elevational view of the charging mechanism of FIG. 2 in its condition with a charge stored therein and while a charge is stored in the movable contact operating mechanism.
Figure 4:
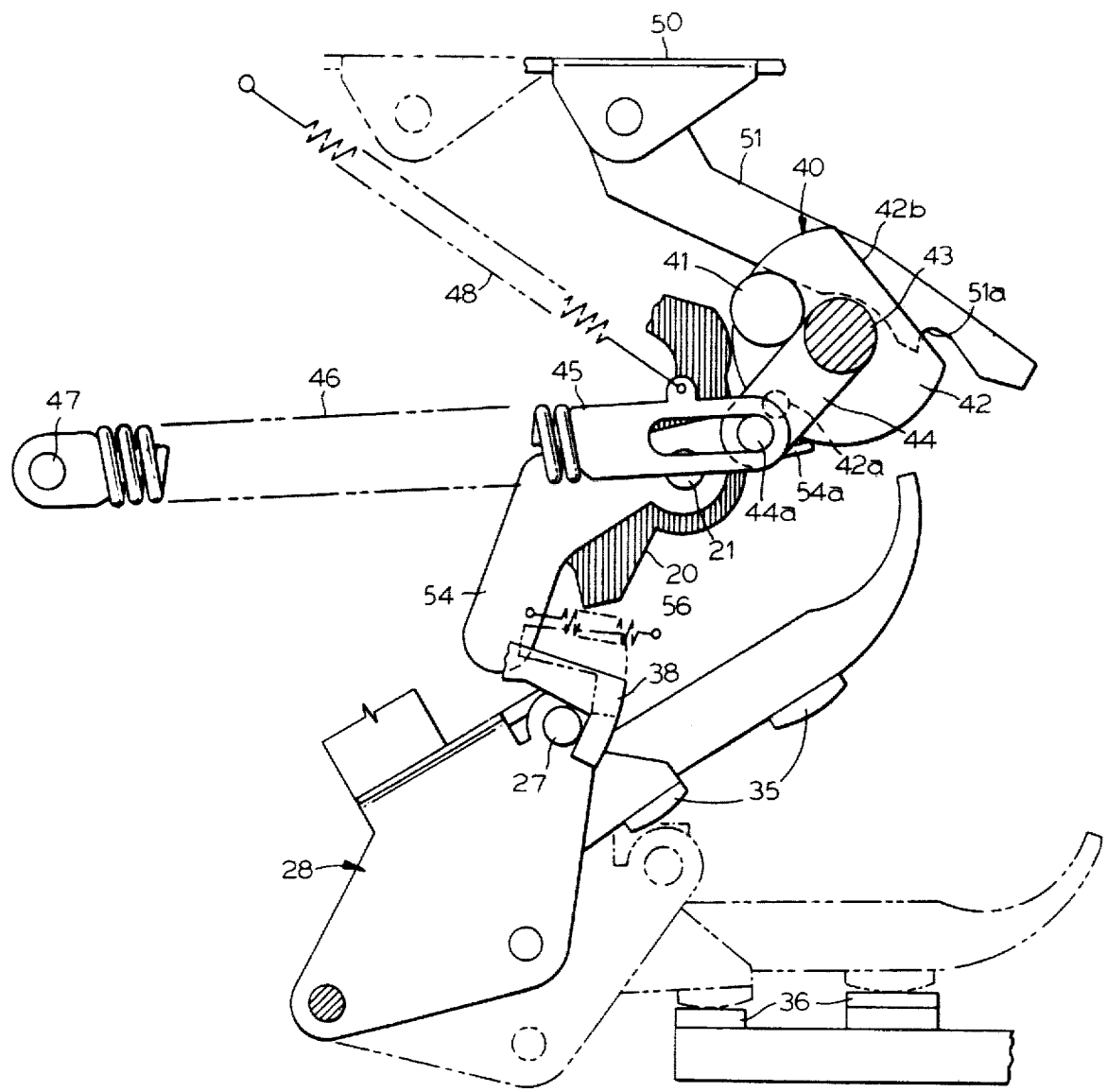
FIG. 4 is a simplified, side elevational view of the charging mechanism seen in its discharged condition while a charge is stored in the movable contact operating mechanism.

Reference is now had to FIGS. 2 through 4 for a review of the overall operation of the circuit breaker disclosed in the above-noted application, Ser. No. 52,276, and specifically the operation of a separate charging mechanism in charging the mechanism springs of the movable contact operating mechanism of FIG. 1. To induce counter-clockwise resetting pivotal movement of cradle 20, a bell crank assembly, generally indicated at 40, is provided with a reset roller 41 eccentrically mounted by a bell crank arm 42 carried by a shaft 43 journalled by the frame sideplates. Keyed to this shaft is an arm 44 which carries at its free end a pin 44a operating in an elongated slot in a spring anchor 45 secured to one end of a powerful tension spring 46. The other end of this spring is anchored to a stationary pin 47. As will be seen, when charging spring 46 discharges, bell crank assembly 40 is rotated clockwise to swing the reset roller around to engage a nose 20c of cradle 20, while in its tripped position, thereby driving the cradle in the counterclockwise direction to its latched reset position, in the process charging the contact operating mechanism springs 32 (FIG. 1).

Referring first to FIG. 2, bell crank assembly 40 is seen in its start angular orientation achieved by the action of a tension spring 48. An operator slide 50 is shown in its left-most return position with a pawl 51, pivotally connected thereto, retracted to a position where a notch 51a in its free end is in intercepting relation with an eccentric pin 42a carried by crank arm 42. From FIG. 3 it is seen that when slide 50 is propelled to the right through a breaker operating mechanism charging stroke, drive pawl 51 is pushed to the right. Its notch 51a picks up pin 42a, causing bell crank assembly 40 to be rotated in the clockwise direction. When the bell crank assembly reaches its angular position of FIG. 3, it is seen that charging spring 46 is stretched to a charged state. It is assumed, at this point in the description, that the movable contact operating mechanism of FIG. 1 is tripped, and thus cradle 20 is in its clockwise-most tripped position seen in FIG. 2. Under these circumstances, the essentially discharged contact operating mechanism springs 32 have lifted movable contact assemblies 28, to a counterclockwise-most tripped open position also seen in FIG. 2. In this position, the top surface of the center pole movable contact assembly engages and lifts the left lower end of a prop 54 pivotally mounted intermediate its ends by cradle pin 21. The upper end 54a of this prop is moved downwardly out of engaging relation with the arcuate surface portion of the bell crank arm against which it is normally engaged under the bias of a return spring 56.

As seen in FIG. 3, the rightward charging stroke of operator slide 50 is sufficient to carry the line of action of charging spring 46 through the axis of the bell crank assembly shaft 43. Consequently, with prop 54 in its FIG. 2 position, the charging spring immediately discharges and the bell crank assembly is thereby driven in the clockwise direction, swinging reset roller 41 into engagement with nose 20c of cradle 20 in its tripped position of FIG. 2. The cradle is thus swung in the counterclockwise direction to its reset position as the discharging springs 46 drive the bell crank assembly to its angular position seen in FIG. 4. As cradle 20 is being reset, contact operating mechanism springs 32 are charged to exert a bias tending to drive the movable contact assemblies 28 to their closed circuit positions seen in phantom in FIGS. 1 and 4. However, hook 38 is in position to intercept pin 27 and detain the movable contact assemblies in their hooked open position seen in FIGS. 3 and 4. By virtue of the loss motion coupling between bell crank assembly 40 and charging spring 46 afforded by the slot in spring anchor 45, spring 48 acts to continue the clockwise rotation of the bell crank assembly from its angular position of FIG. 4 around to its start position of FIG. 2 with pin 44a again bottomed against the right end of the spring anchor slot.

From the description thus far, it is seen that the first charge-discharge cycle of charging spring 46 has been effective in returning the contact operating mechanism cradle 20 to its latched reset position and charge springs 32 thereof, but the breaker contacts are sustained in their open circuit position by hook 38. At this point, the operator slide 50 can be motivated through a second rightward charging stroke to again charge spring 46. Since movable contact assemblies 28, in their hooked open position, have released prop 54, its upper end 54a rides on the arcuate surface portion of bell crank arm 42 as the bell crank assembly is rotated in a clockwise direction. Spring 56 elevates prop end 54a into intercepting relation with a flattened surface 42b of bell crank arm 42 at the conclusion of the operator slide charging stroke just as the line of action of the charging spring 46 passes below the axis of bell crank assembly shaft 43. Thus, as seen in FIG. 3, prop 54 serves to prevent further clockwise rotation of bell crank assembly 40, and the charging spring 46 is held in a fully charged condition. It is thus seen that while the breaker contacts are held in their hooked open circuit position by hook 38, both the charging spring 46 and contact operating mechanism springs 32 are poised in their fully charged conditions. At this point, hook 38 may be articulated to release the movable contact assemblies 28, whereupon they pivot to their closed circuit position under the urgence of mechanism springs 32. It will be noted that closure of the movable contacts has no effect on prop 54, and thus charging spring 46 is sustained in its fully charged condition.

When the circuit breaker is eventually tripped open by removal of latch 34 (FIG. 1), the unlatched cradle 20 swings clockwise to its tripped position, and the movable contact assemblies abruptly pivot upwardly to their tripped open position of FIG. 2, all under the urgence of the discharging contact operating mechanism springs 32. As the center pole movable contact assembly moves to its tripped open position, it picks up the lower end of prop 54, ducking its upper end out of engagement with the flat peripheral surface 42b of crank arm 42. The clockwise rotational restraint on the bell crank assembly is thus removed, and charging spring 46 abruptly discharges, swinging reset roller 41 around to drive cradle 20 from its tripped position of FIG. 2 back to its reset position of FIG. 3. The contact operating mechanism springs 32 are again charged, and the movable contact assemblies 28 move to their hooked open position seen in FIG. 4. At this point, the charging spring 46 may again be charged to create the condition depicted in FIG. 3, and the charge therein will be automatically stored by prop 54 until needed to recharge the contact operating mechanism springs 32. Alternatively, and more significantly, hook 38 may be articulated to precipitate closure of the breaker, and thereafter the breaker may be tripped open without charging the charging spring 46.

From the foregoing description, it is seen that with the breaker contacts open and its contact operating mechanism tripped, the charging spring can be put through a first charge-discharge cycle to charge the contact operating mechanism springs 32 and then a second charge which is stored by prop 54 until needed to re-charge the mechanism springs. Thus, the circuit breaker, starting in its tripped open condition and with two chargings of charging spring 46, can be, in sequence, closed, tripped open, reclosed and tripped open again without an intervening charging of the charging spring. It follows from this that the charging spring can be charged with the breaker contacts closed to achieve, in sequence, opening, closing and opening operations of the circuit breaker without an intervening charge.

Figure 5:
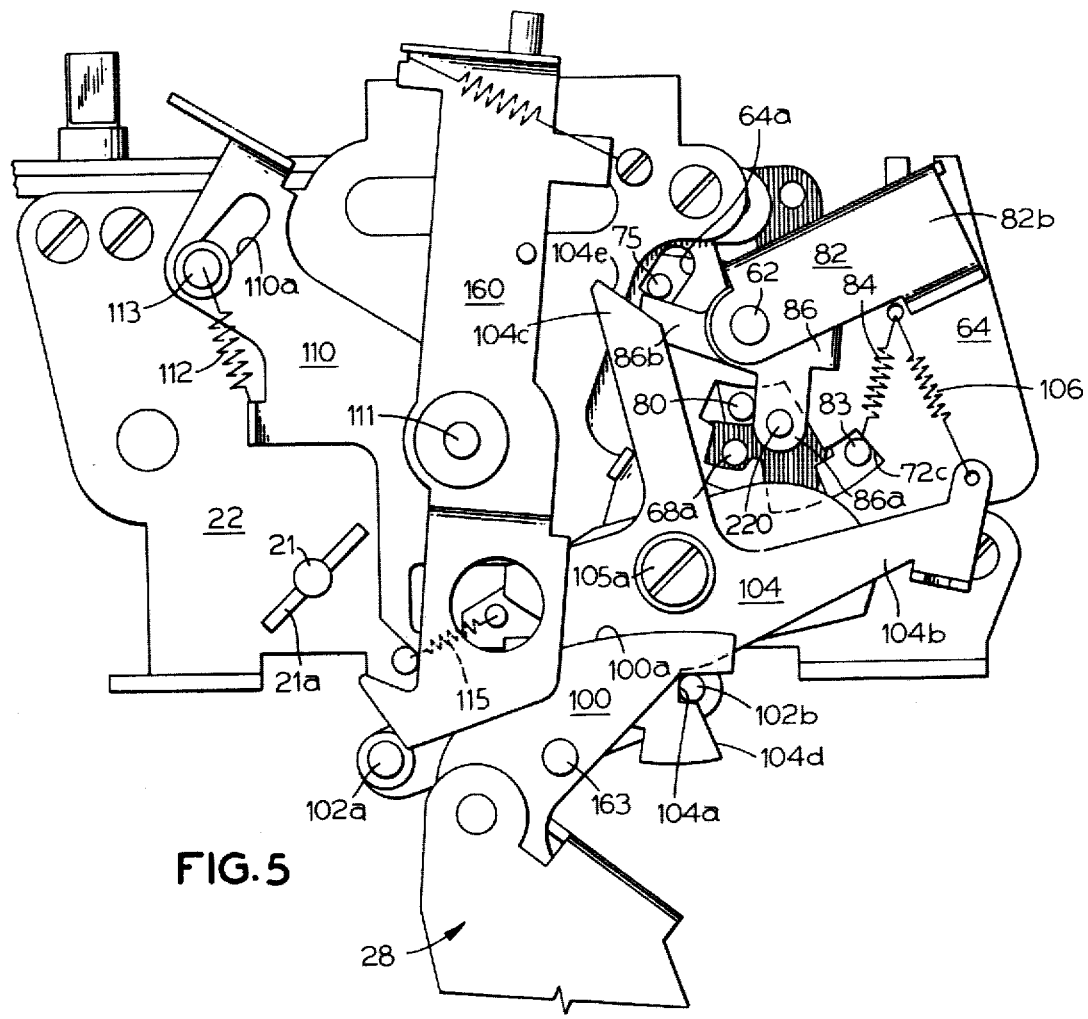
FIG. 5 is a side elevational view of an industrial circuit breaker showing releaseable hook apparatus for holding the breaker movable contacts in their hooked open position of FIG. 3.
Figure 6:
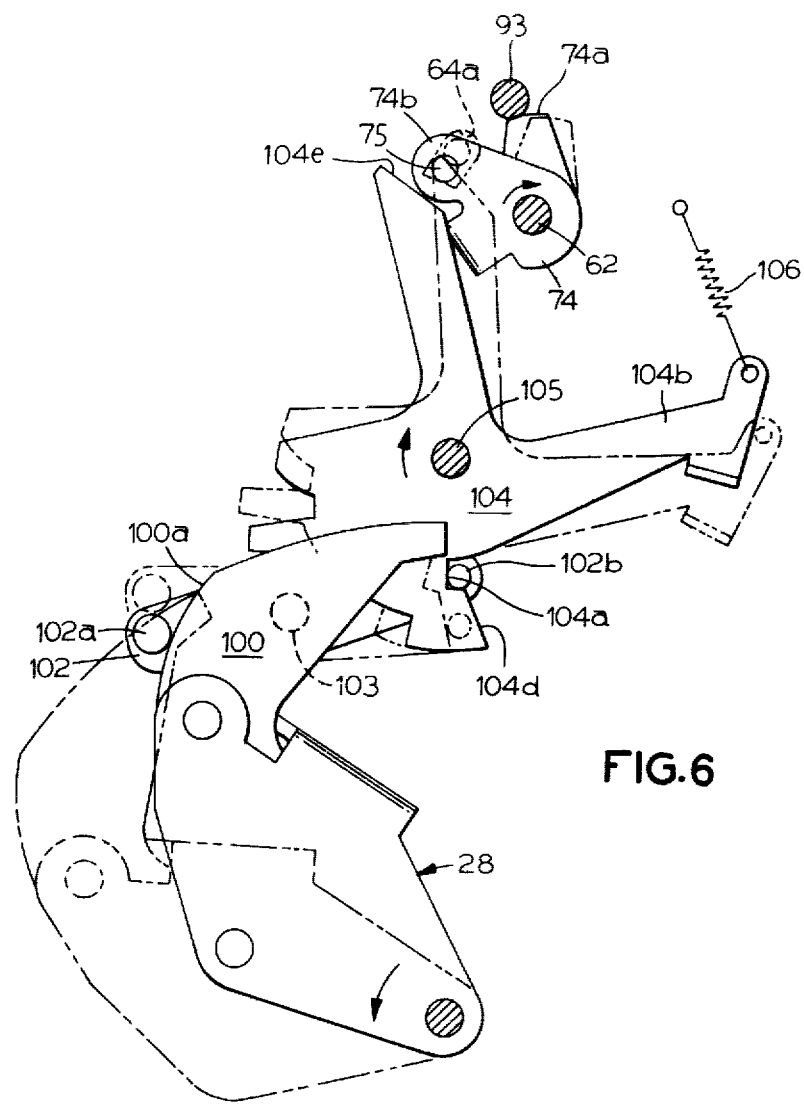
FIG. 6 is a simplified side elevational view of the hook apparatus of FIG. 5, illustrating its release of the breaker movable contacts from their hooked open position.

To contend with the high impact forces incident with stopping the movable contact assemblies 28 in their hooked open position of FIG. 1 as they spring from their tripped open position of FIG. 2 toward their closed circuit position while mechanism springs 32 are charged, a more elaborate hook arrangement than the simple hook 38 was necessitated. To this end, as seen in FIGS. 5 and 6, a cam plate 100, presenting an elongated, compound arcuate cam edge 100a, is mounted by the center pole movable contact assembly. This cam edge engages a roller pin 102a carried at the left end of an intermediate hook lever 102 which is pivotally mounted intermediate its ends on a pin 103 mounted by one of the mechanism frame sideplates 22. The other end of this intermediate hook lever carries a latch pin 102b which is latchably received in a notch 104a provided in a primary hook lever 104 which is pivotally mounted by a hub 105 (FIG. 6); this pivotal mounting being preserved by a screw 105a (FIG. 5). This primary hook lever includes a generally horizontally extending actuating arm 104b and an upstanding actuating finger 104c. A tension spring 106 biases the primary hook lever to a counterclockwise-most latching position with latch pin 102b of the intermediate hook lever lodged in notch 104a.

FIG. 5 depicts the movable contact assemblies in their tripped open position assumed when mechanism springs 32 (FIG. 1) are completely discharged. Under these circumstances, cam edge 100a is disengaged from roller pin 102a of intermediate latch lever 102. When, during the return of cradle 20 from its tripped position by the discharge of charging spring 46 (FIG. 4) pursuant to charging mechanism springs 32, the line of action of the mechanism springs moves to the right of toggle pivot pin 26 (FIG. 1) and the mechanism springs become empowered to straighten the toggle. The movable contact assemblies are thus abruptly propelled from their tripped open position toward their closed circuit position. This closing movement is arrested at the hooked open position when cam edge 100a impacts with roller pin 102a of intermediate hook lever 102. Since latch pin 102b is lodged in primary hook notch 104a, the clockwise movement exerted on the intermediate hook lever by the charging mechanism springs is resisted, and the movable contact assemblies are readily arrested in their hooked open position, seen in solid line in FIG. 6, while the cradle is being re-latched in its reset position.

To now unhook the movable contact assemblies for closure under the urgence of the fully charged mechanism springs, primary hook 104 is simply pivoted from its latching position in the clockwise direction to its unlatching position seen in phantom line in FIG. 6. This pivotal movement, which may be induced by a closing solenoid (not shown) acting on primary hook actuating arm 104b, disengages latch pin 102b from notch 104a. The clockwise pivotal restraint on intermediate hook 102 is thus removed, thereby unhooking the movable contact assemblies for movement to their closed circuit position under the urgence of the charged mechanism springs 32. During this closure movement, cam 100 propels intermediate hook 102 through an increment of clockwise rotation to an unhooking position. In the process, latch pin 102b acts on a sloping edge 104d of primary hook 104 beneath notch 104a to propel the primary hook through an increment of clockwise pivotal movement in addition to and independent of the closure initiating action on the primary hook in initially dislodging latch pin 102b from notch 104a. During this additional increment of clockwise primary hook pivotal movement to an extreme unlatching position induced solely by the closing movement of the movable contact assemblies, the upper edge 104e of primary hook finger 104c picks up pin 75 carried by a secondary latch 74 of a trip latch assembly which is disclosed in detail in the above-noted related application entitled Circuit Breaker Trip Latch Assembly. This secondary latch is thus rotated in the clockwise direction seen in FIG. 6 to swing its prop 74a out from under an intermediate latch pin 93 of the trip latch assembly.

As is described in this related application, whose disclosure is specifically incorporated herein by reference, secondary latch 74 is pivoted from its latching position to its unlatching position incident with the closure of the breaker contacts so as to then qualify a second secondary latch to initiate removal of primary latch 34 from cradle shoulder 20a (FIG. 1) pursuant to tripping the breaker. It is seen that this action is achieved by primary hook 104 acting in response to closure movement of the movable contact assemblies communicated thereto by cam 100 and intermediate hook 102. Preferably, the geometry of primary hook 104 is such that secondary latch pin 75 is not picked up until latch pin 102b is irretrievably dislodged from notch 104a. Thus, secondary latch 74 cannot be removed by the externally induced pivotal movement of the primary hook to initiate unhooking of the movable contact assemblies, but only when the movable contact assemblies are committed to closure. This precludes so-called "crashing" of the breaker operating mechanism while the movable contact assemblies are in their hooked open position by the spurious removal of both secondary latches of the trip latch assembly.

While the movable contact assemblies remain in their closed circuit position, cam 100 maintains intermediate hook 102 and primary hook 104 in their phantom line positions of FIG. 6 and secondary latch 74 is thus held in its phantom line removed or unlatching position to sustain the qualification of the second secondary latch to initiate tripping of the breaker. When the breaker is tripped, the movable contact assemblies spring to their trip open position where cam 100 releases intermediate hook 102, as seen in FIG. 5. Spring 106 is then free to pivot primary hook 104 in the counterclockwise direction back to its latching position. In the process, edge 104d thereof, acting on latch pin 102b, cams intermediate hook 102 in the counterclockwise direction to a hooking position where the latch pin is re-engaged in notch 104a. At the same time, primary hook finger 104c is displaced from pin 75, freeing secondary latch 74 for return to its latching position to which it is spring biased, which is effective to reset the trip latch assembly, again as detailed in the related trip latch assembly application. From FIG. 2 it will be recalled that prop 54 is not removed to initiate recharging of the mechanism springs 32 (FIG. 1) until the movable contact assemblies substantially achieved their tripped open position. Consequently, the resettings of the trip latch and the primary and intermediate hooks are effected essentially before recharging of the mechanism springs begins.

Figure 7:
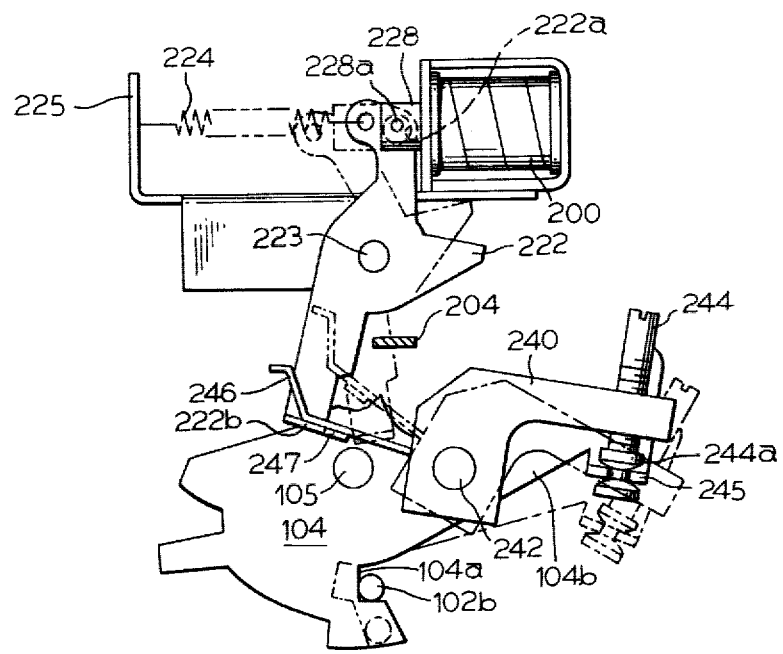
FIG. 7 is a side elevational view of undervoltage release lockout apparatus operating in conjunction with the hook apparatus of FIG. 5.
Figure 8:
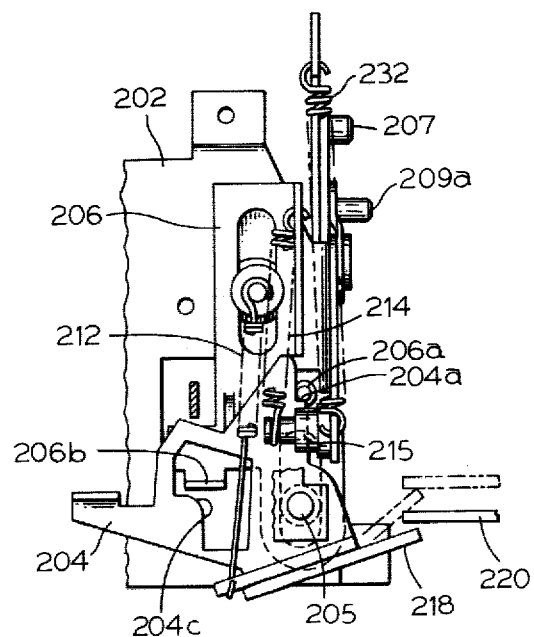
FIG. 8 is a plan view of an accessory trip apparatus interfacing the UVR lockout apparatus of FIG. 7 with the circuit breaker operating mechanism of FIG. 1.
Figure 9:
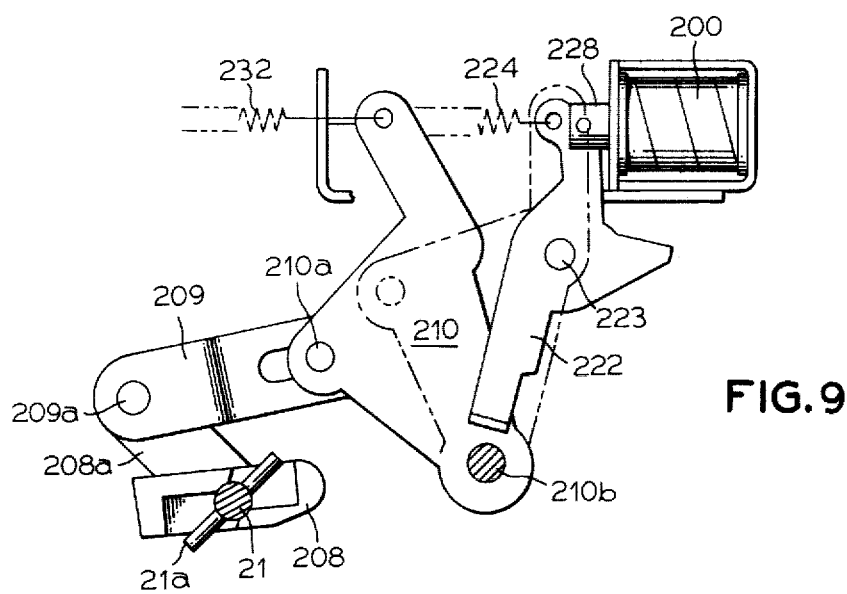
FIG. 9 is a simplified side elevational view of the UVR lockout apparatus of FIG. 7 illustrating the action of the accessory trip apparatus of FIG. 8 to control resetting of the UVR.

FIGS. 7 through 10 are concerned with an accessory tripping apparatus utilizable with the subject circuit breaker, and particularly with the adaptation of an undervoltage release (UVR) solenoid 200 to trip the breaker in response to an abnormally low line voltage condition. The accessory tripping apparatus is constructed in essentially the same manner as disclosed in commonly assigned U.S. Pat. No. 4,097,831, the disclosure of which is specifically incorporated herein by reference. To briefly review this construction, a platform 202, in addition to supporting UVR solenoid 200, pivotally mounts a latch lever 204 at 205 and slideably mounts a trip slide 206, as seen herein in FIG. 8. A platform mounted stub shaft 207 serves to pivotally mount a crank 208 (FIG. 9) which is bored and slotted to receive the terminal portion of cradle pivot pin 21 (FIG. 1) and a transverse pin 21a mounted thereby, which, as seen in FIG. 5, are disposed to the outboard side of one of the mechanism frame sideplates 22. As seen in FIG. 9, crank 208 is integrally formed with a crank arm 208a whose free end is apertured to receive a pin 209a (see also FIG. 8) carried at one end of a link 209. The other end of this link is pivotally connected at 210a to a reset lever 210 pivotally mounted at its lower end to the platform as indicated at 210b.

When cradle 20 is returned to its latched reset position to charge the mechanism springs, its pin 21 is rotated in the clockwise direction seen in FIG. 9. Pin 21a picks up crank 208 and reset lever is propelled clockwise to its phantom line position as the cradle is being reset. As the reset lever is being rotated clockwise, trip slide 206 is latched in a retracted or upward position seen in FIG. 8 by the engagement of a latch pin 206a, carried by the trip slide, with a shoulder 204a of latch lever 204. A tension spring 212 normally biases the latch lever to its clockwise-most position such that its shoulder 204a is disposed to latchingly engage pin 206. Thus, as the reset lever 210 is rotated clockwise to its phantom line position of FIG. 9, a trip spring 214, hooked between the trip slide and a pin 215 mounted by the reset lever is charged. This charge is sustained by the cradle being latched in its reset position and thus being effective to hold the reset lever in its clockwise phantom position.

When an accessory trip function is called for, latch lever 204 is rotated in the counterclockwise direction seen in FIG. 8 to disengage its shoulder 204a from latch pin 206a. Trip slide 206 is thus unlatched, and it is propelled downwardly as spring 214 discharges. An upwardly turned tab 206b of the trip slide, projecting upwardly through a cutout in the latch lever, picks up a nosed edge 204c thereof, and the trip lever is forcefully pivoted in the counterclockwise direction as the trip slide is propelled downwardly. The latch lever carries a paddle 218 which is swung into impacting engagement with a pin 220 which is carried by secondary latch defeat lever 86 seen in FIG. 5 and detailed in the above-noted trip latch assembly application. This lever is positioned with its leg 86a in intercepting relation with pin 80 carried by a trip indicating secondary latch and its arm 86b in intercepting relation with pin 75 carried by secondary latch 74 (FIG. 6). Thus, when paddle 218 trippingly impacts pin 220, secondary latch defeat lever 86 is swung in the clockwise direction seen in FIG. 5 to remove both secondary latches of the trip latch assembly. Removal of secondary latch 74 is effected as well to prevent the movable contact assemblies from moving in the closing direction should they be unhooked and possibly making momentary contact with the stationary contacts during the existence of an undervoltage condition. As will be seen, UVR solenoid 200, in dropping out in response to an abnormal undervoltage condition, initiates tripping action of the accessory package. If latch 74 is not removed under these circumstances, its prop 74a can hold the trip latch assembly in its cradle latching position, even though the other, trip initiating secondary latch is removed, and thus the movable contact assemblies can start to close if released from their hooked open position. Since this closing motion is well under way, when secondary latch 74 is removed by the closing motion response of primary hook 104 (FIG. 6), the resulting tripping articulation of the movable contact operating mechanism may occur too late to prevent the breaker contacts from momentarily kissing. This undesirable situation is avoided conveniently by the removal of both secondary latches via secondary latch defeat lever 86. The trip latch assembly thus becomes totally incapable of sustaining the cradle in its reset position and, under this circumstance, movement of the movable contact assemblies in the closing direction is an impossibility.

As seen in FIGS. 7 and 9, an elongated UVR trip lever 222 is pivotally mounted intermediate its ends on a pin 223. A return spring 224, hooked between a bracket 225 and the upper end of UVR trip lever 222, urges this lever to a counterclockwise-most trip position, seen in phantom in FIG. 7. In this position, the lower end portion of the trip lever is swung to the right into unlatching engagement with latch lever 204. The trip slide is thus released to then drive the latch lever into breaker trip initiating impact with pin 220 of secondary latch defeat lever 86, as described. The plunger 228 of UVR solenoid 200 is equipped with a transverse pin 228a which is received in an enlarged hole 222a provided in the upper end of trip lever 222, as seen in FIG. 7. Thus, the UVR plunger is loosely pinned to the upper end of trip lever 222 and holds this lever in its solid line position against the force of spring 224 if the UVR solenoid is energized under normal line voltage conditions. If the line voltage drops to an abnormal level, the diminished electromagnetic force attempting to maintain the plunger seated is overpowered by spring 224, and trip lever is pulled in the counterclockwise direction, precipitating tripping of the circuit breaker.

Figure 10:
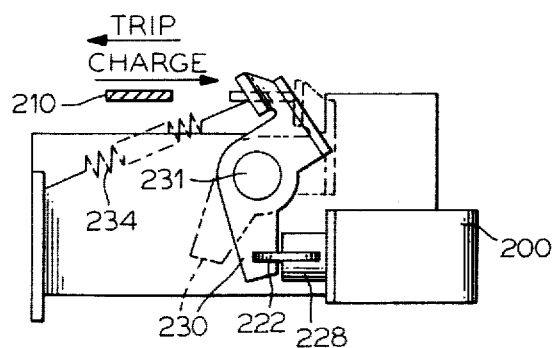
FIG. 10 is a simplified plan view of the UVR lockout apparatus of FIG. 9 depicting resetting of the UVR.

As seen in FIG. 10, a spring-powered reset arm 230, pivotally mounted at 231 is utilized to independently return the plunger to its retracted position as the circuit breaker is tripping. From FIG. 9, it will be noted that, as the cradle springs to its tripped position, its pivot pin 21 rotates in the counterclockwise direction. The restraint holding reset lever 210 in its phantom line, clockwise-most position is thus removed, and spring 232, seen also in FIG. 8, pulls the reset lever counterclockwise to its solid line position. The reset lever thus releases reset arm 230 and a tension spring 234, hooked thereto, propels this arm in the counterclockwise direction seen in FIG. 10. The lower end of arm 230 picks up trip lever 222, propelling it in the clockwise direction of FIG. 9 to return plunger 228 to its retracted position. By virtue of the enlarged pin opening 222a in trip lever 222 (FIG. 7), energization of the UVR solenoid is effective in reseating its plunger. When the cradle is returned to its reset position, which incidentally drives reset lever 210 to its phantom line position of FIG. 9, the reset lever picks up and holds resetting arm 230, in its phantom line position of FIG. 10 in displaced relation to trip lever 222. Thus, spring 224 is empowered to unseat plunger 228 and trip the breaker in response to an abnormally low line voltage condition. It will be noted that, as resetting arm is being removed by reset lever 210, the moment arm for spring 234, a necessarily powerful spring since it must overpower plunger unseating spring 224, is progressively decreased. This feature helps to prevent the loading on the charging springs 46 acting to reset the cradle and charge the mechanism springs from becoming excessively large.

A final feature to be discussed is the provision enabling the subject circuit breaker to be charged against a de-energized or under-energized UVR solenoid. This is significant when the circuit breaker is equipped with a motor operator mechanism which is wired for automatic recharging, i.e., the motor operator mechanism automatically recharges the mechanism springs via the charging springs each time the breaker is tripped. In this case, incorporated into the motor operator mechanism wiring logic is one switch to sense when the breaker is tripped, so as to activate the motor operator mechanism, and a second switch to sense when the mechanism springs are charged, so as to then de-activate the motor operator mechanism. However, if the UVR solenoid is dropped out because of a persistent low voltage condition, both secondary latches are removed, and the operating mechanism can not sustain a charge. As a result, the motor operator mechanism continues to cycle in vain attempts to charge the mechanism springs, and eventually burns out.

To prevent this situation, as seen in FIG. 7, an antipump arm 240 is pinned to a shaft 242 journalled by the accessory apparatus mounting platform 202 (FIG. 8). The free end of this arm carries a screw 244 having a double head 244a engaged in a notch formed in a laterally turned tab 245 created at the free end of the arm 104b of primary hook 104. Arm 240 also mounts a finger 246 to which is affixed a latching button 247 for latchably engaging a laterally turned tab 222b created at the lower end of UVR trip lever 222.

It is seen from FIG. 7 that, while primary hook 104 is in its solid line position to latchingly hold pin 102b of intermediate hook 102 (FIG. 6) in its notch 104a and thus hook the movable contact assemblies in their hooked open position, arm 240 is angularly positioned to orient finger 246 such that button 247 is disposed to latchingly engage tab 222b of the UVR trip lever. This trip lever is thus held in its solidline clockwise-most inactive position against the bias of spring 224 even though UVR solenoid 200 is de-energized or underenergized. Consequently, latch lever 204 is not impacted by trip lever 222 to precipitate removal of the secondary latches in the trip latch assembly, and the circuit breaker can be charged despite the fact that the UVR solenoid energizing voltage is below the level necessary to hold its plunger 228 seated against the bias of spring 224. Thus, cycling or pumping of the motor operator mechanism is terminated.

To prevent closure of the breaker contacts while the line voltage is abnormally low, it is seen from FIG. 7 that initial clockwise pivotal movement of primary hook 104, leading to unhooking of the movable contacts from their hooked open position is effective to unlatch button 247 from UVR trip lever tab 222b. If at this time the UVR solenoid is insufficiently energized to hold its plunger seated against the bias of spring 224, trip lever 222 is pulled to its phantom line, trip position, picking up latch lever 204 to precipitate removal of both secondary latches, whereupon the charge in the mechanism springs is dumped. It will be noted that this charge is dumped before the primary hook is sufficiently pivoted in the clockwise direction to clear its notch 104a from pin 102b and thus unhook the movable contact assemblies. Consequently, any movement of the movable contact assemblies in the closing direction as they are unhooked is precluded.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described the invention, what I claim as new and desire to secure by Letters Patent is:

1. Undervoltage Release apparatus for a circuit breaker having a spring-powered operating mechanism for motivating movable contacts between a tripped open position and a closed position, hook means for holding the movable contacts in an intermediate hooked open position against the force of the charged operating mechanism acting to propel the movable contacts to their closed position, and a trip latch assembly for releaseably holding the operating mechanism in its charged condition; said apparatus comprising, in combination:

A. an undervoltage release solenoid having a plunger movable between seated and extended positions;

B. a return spring biasing said plunger to its extended position;

C. an elongated trip lever pivotally mounted intermediate its ends, said lever connected adjacent one of its ends with said plunger for retention in an inactive position by the magnetic force developed by said solenoid due to electrical energization in response to normal line voltage levels to maintain said plunger in its seated position against the bias of said return spring, said return spring propelling said plunger to its extended position and said lever to a trip initiating position effective in conditioning the trip latch assembly to discharge the operating mechanism and cause the movable contacts to spring to their tripped open position when the line voltage falls to an abnormally low level; and D. lockout means releaseably engaging the other end of said trip lever to latch same in its inactive position against the bias of said return spring, said lockout means controllably coupled with the hook means such as to unlatch said trip lever from its inactive position incident to initial articulation of the hook means leading to the release of the movable contacts from their hooked open position, whereby, with the existence of an abnormally low line voltage condition, said trip lever assumes its trip position to precipitate discharge of the operating mechanism before the movable contacts are fully released from their hooked open position.

2. The undervoltage release apparatus defined in claim 1, which further includes a spring-powered accessory trip mechanism capable of being latched in a charged condition and, when unlatched, discharging to propel a trip member into engagement with the trip latch assembly and thereby render same incapable of holding the operating mechanism in its charged condition, (1) said trip mechanism coupled with the operating mechanism such as to be charged incident with charging of the operating mechanism, and (2) said trip lever engageably unlatching said trip mechanism incident with movement to its trip initiating position.

3. The undervoltage release apparatus defined in claim 2, which further includes a reset lever pivotally mounted for movement between a reset position and a removed position, and a reset spring biasing said reset lever to its reset position, (1) said reset lever propelling said plunger to its seated position and said trip lever to its inactive position against the bias of said return spring incident with the propulsion of said reset lever to its reset position by said reset spring, and (2) said trip mechanism propelling said reset lever to its removed position in non-interfering relation with said trip lever and plunger incident with the charging of said trip mechanism by the operating mechanism.

4. The undervoltage release apparatus defined in claim 3, wherein said reset lever is pivotally mounted intermediate its ends with said reset spring hooked to one end thereof, and a portion of the other end thereof engageably moving said plunger to its seated position and said trip lever to its inactive position under the bias of said reset spring, during propulsion of said reset lever to its removed position by said trip mechanism, the moment arm of said reset spring force acting on said reset lever is progressively decreased.

5. The undervoltage release apparatus defined in claim 1, wherein said lockout means includes:
   (1) a rotatably mounted shaft,
   (2) a first arm affixed to said shaft with its free end coupled with said hook means,
   (3) a second arm affixed to said shaft, and
   (4) a latch element carried adjacent the free end of said second arm for latchingly engaging the other end of said trip lever to releaseably hold same in its inactive position,
   (5) whereby, initial unhooking movement of the hook means induces sufficient rotation of said shaft to disengage said latch element from said trip lever.

6. The undervoltage release apparatus defined in claim 5, which further includes a spring-powered accessory trip mechanism capable of being latched in a charged condition and, when unlatched, discharging to propel a trip member into engagement with the trip latch assembly and thereby render same incapable of holding the operating mechanism in its charged condition,
   (1) said trip mechanism coupled with the operating mechanism such as to be charged incident with charging of the operating mechanism, and
   (2) said trip lever engageably unlatching said trip mechanism incident with movement to its trip initiating position.

7. The undervoltage release apparatus defined in claim 6, which further includes a reset lever pivotally mounted for movement between a reset position and a removed position, and a reset spring biasing said reset lever to its reset position.
   (1) said reset lever propelling said plunger to its seated position and said trip lever to its inactive position against the bias of said return spring incident with the propulsion of said reset lever to its reset position by said reset spring, and
   (2) said trip mechanism propelling said reset lever to its removable position in non-interfering relation with said trip lever and plunger incident with the charging of said trip mechanism by the operating mechanism.

8. The undervoltage release apparatus defined in claim 7, wherein said reset lever is pivotally mounted intermediate its ends with said reset spring hooked to one end thereof, and a portion of the other end thereof engageably moving said plunger to its seated position and said trip lever to its inactive position under the bias of said reset spring, during propulsion of said reset lever to its removed position by said trip mechanism, the moment arm of said reset spring force acting on said reset lever is progressively decreased.

* * * * *